United States Patent
Takezawa

(10) Patent No.: US 8,039,148 B2
(45) Date of Patent: Oct. 18, 2011

(54) NON-AQUEOUS ELECTROLYTE SECONDARY BATTERY

(75) Inventor: Hideharu Takezawa, Nara (JP)

(73) Assignee: Panasonic Corporation, Osaka (JP)

( * ) Notice: Subject to any disclaimer, the term of this patent is extended or adjusted under 35 U.S.C. 154(b) by 681 days.

(21) Appl. No.: 12/096,966

(22) PCT Filed: Dec. 11, 2006

(86) PCT No.: PCT/JP2006/324662
§ 371 (c)(1),
(2), (4) Date: Jun. 11, 2008

(87) PCT Pub. No.: WO2007/069562
PCT Pub. Date: Jun. 21, 2007

(65) Prior Publication Data
US 2009/0155686 A1    Jun. 18, 2009

(30) Foreign Application Priority Data
Dec. 13, 2005 (JP) .................... 2005-358780

(51) Int. Cl.
*H01M 6/04* (2006.01)
*H01M 4/60* (2006.01)

(52) U.S. Cl. ................... 429/199; 429/213
(58) Field of Classification Search .......... 429/199, 429/213
See application file for complete search history.

(56) References Cited

FOREIGN PATENT DOCUMENTS

| EP | 1 052 714 A1 | 11/2000 |
|---|---|---|
| JP | 11-7979 | 1/1999 |
| JP | 2000-173589 | 6/2000 |
| JP | 2001-135352 | 5/2001 |
| JP | 2001135352 A * | 5/2001 |
| JP | 2002-373653 | 12/2002 |
| JP | 2004-220910 | 8/2004 |
| JP | 2004220910 A * | 8/2004 |
| JP | 2004-349056 | 12/2004 |

* cited by examiner

*Primary Examiner* — Karie O'Neill Apicella
(74) *Attorney, Agent, or Firm* — McDermott Will & Emery LLP

(57) ABSTRACT

A non-aqueous electrolyte secondary battery of this invention includes a positive electrode including a positive electrode mixture, a negative electrode including a negative electrode mixture, and a non-aqueous electrolyte. The negative electrode mixture includes a material capable of absorbing and desorbing Li and a carbon material. The material capable of absorbing and desorbing Li includes at least one element selected from the group consisting of Si and Sn, and the amount of the carbon material is 3 to 60% by weight of the negative electrode mixture. At least one of the positive electrode, the negative electrode, and the non-aqueous electrolyte contains a lithium perfluoroalkylsulfonyl imide represented by the following general formula (1):

$$\text{LiN}(C_mF_{2m+1}SO_2)(C_nF_{2n+1}SO_2) \tag{1}$$

where m and n each represent an integer of 1 to 5 and may be m=n. The ratio of the weight of the lithium perfluoroalkylsulfonyl imide to the weight of the carbon material is $10^{-3}$ to 10.

9 Claims, 1 Drawing Sheet

F I G. 1
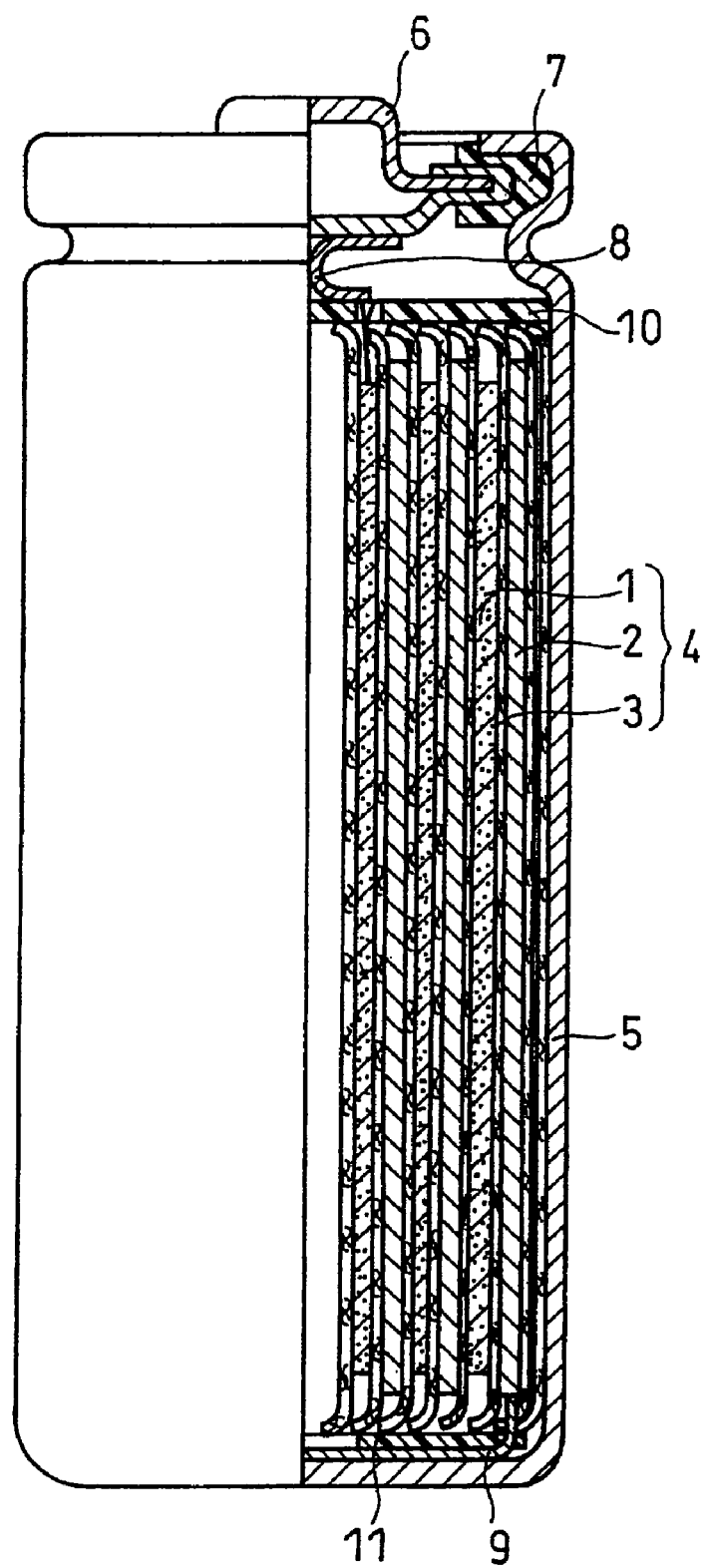

NON-AQUEOUS ELECTROLYTE SECONDARY BATTERY

RELATED APPLICATIONS

This application is the U.S. National Phase under 35 U.S.C. §371 of International Application No. PCT/JP2006/324662, filed on Dec. 11, 2006, which in turn claims the benefit of Japanese Application No. 2005-358780, filed on Dec. 13, 2005, the disclosures of which Applications are incorporated by reference herein.

TECHNICAL FIELD

The invention relates to a non-aqueous electrolyte secondary battery, and more particularly, to an improvement in its electrode and non-aqueous electrolyte.

BACKGROUND ART

A negative electrode active material such as silicon is expected to provide a higher capacity than carbon materials such as graphite. However, such a negative electrode active material undergoes large volume changes due to charge/discharge. The large volume changes make the contact between the active material and the current collector insufficient or the like, so that the current-collecting capability decreases. This results in degradation of cycle characteristics.

To improve the current-collecting capability, there has been a proposal to mechanically cover the surface of silicon oxide particles with a carbon material (see Patent Document 1). Also, there has been another proposal to form carbon fibers on the surface of an active material core containing a metal or semimetal capable of forming a lithium alloy, for example, by CVD (see Patent Document 2).

Patent Document 1: Japanese Laid-Open Patent Publication No. 2002-373653
Patent Document 2: Japanese Laid-Open Patent Publication No. 2004-349056

DISCLOSURE OF THE INVENTION

Problem to be Solved by the Invention

Patent Document 1 and Patent Document 2 disclose preferable amounts of the carbon material (e.g., carbon fibers) added to the negative electrode active material. However, the present inventors have found through examination that in the case of using a negative electrode active material that is expected to provide a high capacity but expands and contracts significantly, such as silicon, the addition of a disclosed amount of a carbon material to the negative electrode does not sufficiently improve the cycle characteristics.

A possible approach to maintaining the ability to collect current among active material particles that undergo large volume changes is, for example, to increase the content of a conductive agent comprising a carbon material in a negative electrode and reduce the size of the conductive agent, in order to increase the contact points among the active material particles.

However, when the content of a conductive agent comprising a carbon material in a negative electrode is large, the wettability of the negative electrode with non-aqueous electrolyte may decrease. This is probably because: the wettability of the negative electrode with non-aqueous electrolyte is determined by the wettability of the carbon material with non-aqueous electrolyte; and the surface of the carbon material is highly resistant to wetting with non-aqueous electrolyte due to the small surface free energy of the carbon material and the large difference from the surface tension (i.e., surface free energy) of non-aqueous electrolyte.

Also, an electrode is usually provided with pores in order to efficiently carry out electrode reaction. A carbon material serving as the conductive agent is also related to the formation of pores. However, since the carbon material is resistant to wetting with non-aqueous electrolyte, as described above, capillarity is unlikely to occur and the non-aqueous electrolyte is unlikely to enter the pores. Hence, the non-aqueous electrolyte is unlikely to sufficiently permeate the whole electrode. As a result, the arrival of the non-aqueous electrolyte at the surface of the negative electrode active material is impeded. This is evident in a negative electrode including carbon fibers with a fiber diameter of 1 μm or less as the conductive agent.

For the reasons as described above, when a large amount of a carbon material is included to improve the current-collecting capability of a negative electrode including a negative electrode active material such as Si, the performance of the negative electrode is not fully exhibited. Further, since the permeation of the non-aqueous electrolyte into the electrode takes a long time, efficient battery production is not possible.

Moreover, even if the non-aqueous electrolyte has seemingly permeated the electrode, part of the surface of the negative electrode active material may remain unwet with the non-aqueous electrolyte. Since such part unwet with the non-aqueous electrolyte does not contribute to charge/discharge, as described above, the capacity decreases. Also, if part of the surface of the negative electrode active material remains unwet with the non-aqueous electrolyte, charge/discharge reaction becomes uneven, thereby resulting in degradation of cycle characteristics.

Means for Solving the Problem

The invention relates to a non-aqueous electrolyte secondary battery including a positive electrode including a positive electrode mixture, a negative electrode including a negative electrode mixture, and a non-aqueous electrolyte. The negative electrode mixture includes a material capable of absorbing and desorbing Li and a carbon material, and the material capable of absorbing and desorbing Li includes at least one element selected from the group consisting of Si and Sn. The amount of the carbon material is 3 to 60% by weight of the negative electrode mixture. At least one of the positive electrode, the negative electrode, and the non-aqueous electrolyte contains a lithium perfluoroalkylsulfonyl imide represented by the following general formula (1):

$$\text{LiN}(C_mF_{2m+1}SO_2)(C_nF_{2n+1}SO_2) \qquad (1)$$

where m and n each represent an integer of 1 to 5 and may be m=n. The ratio of the total weight of the lithium perfluoroalkylsulfonyl imide to the weight of the carbon material is $10^{-3}$ to 10.

The lithium perfluoroalkylsulfonyl imide is preferably at least one selected from the group consisting of LiN(CF$_3$SO$_2$)$_2$ and LiN(C$_2$F$_5$SO$_2$)$_2$.

The carbon material is preferably carbon nanofibers. More preferably, the carbon nanofibers are bonded to a surface of the material capable of absorbing and desorbing Li while a catalytic element for promoting the growth of the carbon nanofibers is carried on the surface of the material capable of absorbing and desorbing Li or an end of the carbon nanofibers. The carbon nanofibers preferably account for 5 to 70% by weight of the total of the carbon nanofibers, the material capable of absorbing and desorbing Li, and the catalytic element.

The lithium perfluoroalkylsulfonyl imide is preferably contained in at least the negative electrode.

EFFECT OF THE INVENTION

In the invention, the negative electrode includes a carbon material and a high capacity material capable of absorbing and desorbing Li, and at least one of the positive electrode, the negative electrode, and the non-aqueous electrolyte contains a lithium perfluoroalkylsulfonyl imide represented by the above formula (1). Thus, even if a large amount of the carbon material is included in the negative electrode to improve the current-collecting capability, the wettability of the negative electrode with the non-aqueous electrolyte is improved, and the whole negative electrode is impregnated with the non-aqueous electrolyte. It is therefore possible to provide a non-aqueous electrolyte secondary battery with a high capacity and excellent cycle characteristics.

BRIEF DESCRIPTION OF THE DRAWING

FIG. 1 is a schematic longitudinal sectional view of a cylindrical battery produced in an Example.

BEST MODE FOR CARRYING OUT THE INVENTION

A non-aqueous electrolyte secondary battery of the invention includes a positive electrode including a positive electrode mixture, a negative electrode including a negative electrode mixture, and a non-aqueous electrolyte. The negative electrode mixture includes a material capable of absorbing and desorbing Li and a carbon material. The material capable of absorbing and desorbing Li includes at least one element selected from the group consisting of Si and Sn. The amount of the carbon material is 3 to 60% by weight of the negative electrode mixture. At least one of the positive electrode, the negative electrode, and the non-aqueous electrolyte contains a lithium perfluoroalkylsulfonyl imide represented by the following general formula (1):

$$\text{LiN}(C_mF_{2m+1}SO_2)(C_nF_{2n+1}SO_2) \quad (1)$$

where m and n each represent an integer of 1 to 5 and may be m=n. The weight ratio of the total of the lithium perfluoroalkylsulfonyl imide contained in at least one of the positive electrode, the negative electrode, and the non-aqueous electrolyte to the carbon material is $10^{-3}$ to 10.

In the invention, since the negative electrode mixture contains the carbon material, even when the volume of the material capable of absorbing and desorbing Li changes significantly due to charge/discharge cycles, the ability to collect current among the particles of the material capable of absorbing and desorbing Li can be maintained. Further, due to the action of the perfluoroalkylsulfonyl imide anion represented by the general formula (1) on the surface of the carbon material, the wettability of the negative electrode with the non-aqueous electrolyte can be improved. As a result, the non-aqueous electrolyte can permeate the whole negative electrode, so that a decrease of battery capacity and degradation of cycle characteristics can be suppressed.

The ratio of the weight of the lithium perfluoroalkylsulfonyl imide contained in at least one of the positive electrode, the negative electrode, and the non-aqueous electrolyte to the weight of the carbon material is $10^{-3}$ to 10, and preferably $10^{-2}$ to 10. When the ratio of the lithium perfluoroalkylsulfonyl imide is in this range, the wettability of the negative electrode can be improved. Hence, the time necessary for electrolyte injection can be shortened, and a decrease of battery capacity can be prevented. If the ratio of the weight of the lithium perfluoroalkylsulfonyl imide to the weight of the carbon material is less than $10^{-3}$, the effect of improving the wettability of the carbon material becomes insufficient. If the ratio of the weight of the lithium perfluoroalkylsulfonyl imide to the weight of the carbon material is more than 10, a coating film comprising decomposition products of the lithium perfluoroalkylsulfonyl imide is formed on the surface of the carbon material. As a result, the cycle characteristics lower.

When the lithium perfluoroalkylsulfonyl imide is contained in the non-aqueous electrolyte, if the amount thereof is in the above range, the concentration of the lithium perfluoroalkylsulfonyl imide in the non-aqueous electrolyte is less than 1 mol/L, although it depends on the amount of the carbon material in the negative electrode, the amount of the non-aqueous electrolyte, and the molecular weight of the lithium perfluoroalkylsulfonyl imide used.

If the lithium perfluoroalkylsulfonyl imide is contained in at least two of the positive electrode, the negative electrode, and the non-aqueous electrolyte, the ratio of the total weight of the lithium perfluoroalkylsulfonyl imide contained therein to the weight of the carbon material is $10^{-3}$ to 10. For example, when the lithium perfluoroalkylsulfonyl imide is contained in the negative electrode and the non-aqueous electrolyte, the ratio of the total weight of the lithium perfluoroalkylsulfonyl imide contained in the negative electrode and the non-aqueous electrolyte to the weight of the carbon material is $10^{-3}$ to 10.

It is preferable that the lithium perfluoroalkylsulfonyl imide be contained in the negative electrode. When the negative electrode contains the lithium perfluoroalkylsulfonyl imide, the carbon material becomes more wettable with the non-aqueous electrolyte.

When the lithium perfluoroalkylsulfonyl imide is contained in the positive electrode, it dissolves into the non-aqueous electrolyte from the positive electrode, and then moves into the negative electrode from the non-aqueous electrolyte. Thus, when the lithium perfluoroalkylsulfonyl imide is contained in the positive electrode, the wettability of the carbon material contained in the negative electrode mixture with the non-aqueous electrolyte can also be improved.

Examples of lithium perfluoroalkylsulfonyl imides represented by the above general formula (1) include $\text{LiN}(CF_3SO_2)_2$, $\text{LiN}(C_2F_5SO_2)_2$, $\text{LiN}(CF_3SO_2)(C_4F_9SO_2)$, and $\text{LiN}(C_2F_5SO_2)(C_4F_9SO_2)$. They can be used singly or in combination of two or more of them.

Among the compounds, $\text{LiN}(CF_3SO_2)_2$ and $\text{LiN}(C_2F_5SO_2)_2$ are particularly preferable, since they can, for example, heighten the conductivity of the non-aqueous electrolyte when added to the non-aqueous electrolyte.

The material capable of absorbing and desorbing Li serving as the negative electrode active material includes at least one element selected from the group consisting of Si and Sn. Examples of such materials include Si simple substance, Sn simple substance, and materials containing Si or Sn. Si simple substance and Sn simple substance are capable of absorbing large amounts of Li, being alloyable with Li. Examples of materials containing Si or Sn include oxides such as $SiO_x$ where $0<x<2$ and $SnO_y$ where $0<y\leq2$, and alloys containing a transition metal element such as Ni—Si alloy, Ti—Si alloy, Mg—Sn alloy, and Fe—Sn alloy.

These materials can be used singly or in combination of two or more of them.

The negative electrode active material may contain, for example, a simple substance such as Al, Si, Zn, Ge, Cd, Sn, or Pb and a material containing such an element, in addition to the material capable of absorbing and desorbing Li which contains at least one of Si and Sn. In this case, the material capable of absorbing and desorbing Li which contains at least one of Si and Sn preferably accounts for not less than 30% by weight of the negative electrode active material.

Examples of the carbon material serving as the conductive agent include graphites such as natural graphite (e.g., flake graphite), artificial graphite, and expanded graphite, carbon blacks such as acetylene black and ketjen black, and carbon fibers. Among them, the use of carbon blacks such as acetylene black and ketjen black and carbon fibers such as vapor-phase growth carbon fibers, carbon nanofibers, and carbon nanotubes is preferable and the use of carbon nanofibers is particularly preferable since they can increase the contact points among the active material particles even when the active material has a high expansion rate. This is because the lithium perfluoroalkylsulfonyl imide exhibits the most significant effect on carbon nanofibers.

The amount of the carbon material is preferably 3 to 60% by weight, and more preferably 10 to 40% by weight, of the negative electrode mixture. If the amount of the carbon material is less than 3% by weight, the current-collecting capability of the negative electrode mixture layer cannot be maintained. If the amount of the carbon material is greater than 60% by weight, a negative electrode having a sufficient capacity cannot be obtained.

When carbon nanofibers are used as the carbon material, the shape of the carbon nanofibers is not particularly limited. For example, tube, accordion, plate, or herringbone shaped carbon nanofibers can be used. The carbon nanofibers may include only one of such shapes or may include two or more of them. The carbon nanofibers may be in other shapes than the above.

The fiber diameter of the carbon nanofibers is preferably 1 nm to 1000 nm, and more preferably 50 nm to 300 nm. If the fiber diameter is less than 1 nm, it is very difficult to synthesize such carbon nanofibers. Thus, the productivity may become low. If the fiber diameter of the carbon nanofibers is greater than 1000 nm, the ability to collect current of an active material with a high expansion rate may not be maintained.

The fiber length of the carbon nanofibers is preferably 1 nm to 1000 µm, and more preferably 500 nm to 100 µm. If the fiber length of the carbon nanofibers is less than 1 nm, the effect of improving the conductivity of the negative electrode and the effect of absorbing the expansion stress of the active material may decrease. If the fiber length of the carbon nanofibers is greater than 1000 µm, the active material density in the negative electrode becomes low, and a high energy-density negative electrode may not be obtained.

The fiber length and fiber diameter of the carbon nanofibers can be measured, for example, as follows using a scanning electron microscope (SEM). The length and diameter of any 20 to 100 carbon nanofibers are measured. The average values of the obtained results can be used as the fiber length and the fiber diameter.

When carbon nanofibers are used as the carbon material, it is preferable that the carbon nanofibers be bonded to the surface of the material capable of absorbing and desorbing Li and that a catalytic element for promoting the growth of the carbon nanofibers be carried on the surface of the material capable of absorbing and desorbing Li or the end of the carbon nanofibers.

In this case, it is preferable that the carbon nanofibers be directly bonded to the surface of the material capable of absorbing and desorbing Li. That is, at the points where the carbon nanofibers are bonded to the material capable of absorbing and desorbing Li, it is preferable that the element(s) constituting the material capable of absorbing and desorbing Li and the carbon constituting the carbon nanofibers form a compound.

It is also preferable that at least one end of the carbon nanofibers be bonded to the surface of the material capable of absorbing and desorbing Li. It is further preferable that only the one end of the carbon nanofibers be bonded to the surface of the material capable of absorbing and desorbing Li.

As used herein, "bonded" includes chemical bonding and physical bonding between the element(s) constituting the material capable of absorbing and desorbing Li and the carbon constituting the carbon nanofibers, but does not include bonding with a resin component positioned therebetween. Chemical bonding includes ionic bonding and covalent bonding, and physical bonding includes bonding by intermolecular force.

The catalytic element for promoting the growth of the carbon nanofibers is not particularly limited, and examples include Mn, Fe, Co, Ni, Cu, and Mo. These catalytic elements can be used singly or in combination of two or more of them.

The content of the carbon nanofibers is preferably 5 to 70% by weight, and more preferably 10% by weight to 40% by weight, of the total of the material capable of absorbing and desorbing Li, the catalytic element, and the carbon nanofibers. If the content of the carbon nanofibers is less than 5% by weight, the effect of improving the conductivity among the active material particles and the effect of absorbing the expansion stress of the active material may decrease. If the content of the carbon nanofibers is greater than 70% by weight, the active material density in the negative electrode may become low.

Next, an exemplary method for forming carbon nanofibers on the surface of a material capable of absorbing and desorbing Li is described.

If no catalyst is present, the growth of carbon nanofibers is not found. It is thus necessary to cause a material capable of absorbing and desorbing Li to carry a catalytic element.

The catalytic element carried on the material capable of absorbing and desorbing Li may be in the form of a metal or a compound (e.g., an oxide). When the catalytic element is in the form of a metal, the catalytic element may be a simple substance of a metal, or may be alloyed with another element. When the catalytic element is in the form of an alloy, the alloy may be composed of catalytic elements mentioned above, or the alloy may be composed of a catalytic element mentioned above and another metal element.

The catalytic element carried on the surface of the material capable of absorbing and desorbing Li may be in any of the above-described forms. The catalytic element carried on the surface of the material capable of absorbing and desorbing Li may be in two or more kinds of forms. Also, the catalytic element is preferably present in particulate form on the surface of the material capable of absorbing and desorbing Li. The catalytic element may be carried on the end of the carbon nanofibers.

The method for carrying the catalytic element is not particularly limited, but a method of carrying a compound containing a catalytic element is easier than carrying a simple substance of a catalytic element. Since the catalytic element is desirably in the form of a metal (simple substance) until the growth of carbon nanofibers is completed, a compound containing the catalytic element is reduced immediately before growing carbon nanofibers in order to convert the form of the catalytic element to metal.

The compound containing the catalytic element is not particularly limited, and for example, oxides, carbides, nitrates, etc., can be used. Among them, the use of nitrates is preferable. Examples of nitrates include nickel nitrate hexahydrate, cobalt nitrate hexahydrate, iron nitrate enneahydrate, copper nitrate trihydrate, manganese nitrate hexahydrate, and hexaammonium heptamolybdate tetrahydrate. Among them, the use of nickel nitrate and cobalt nitrate is preferable.

A gas serving as a raw material of carbon nanofibers is introduced into a high temperature atmosphere in a reaction vessel containing a material capable of absorbing and desorbing Li with a catalytic element carried thereon, to form carbon nanofibers on the surface of the material capable of absorbing and desorbing Li.

For example, a material capable of absorbing and desorbing Li with a compound containing a catalytic element carried thereon is placed into a ceramic reaction vessel, and is heated to a predetermined temperature in an inert gas or a reducing gas. After the material capable of absorbing and desorbing Li is heated to the predetermined temperature, a raw material gas serving as a raw material of carbon nanofibers is introduced into the reaction vessel, and carbon nanofibers are grown on the surface of the material capable of absorbing and desorbing Li, for example, in one minute to 5 hours.

At this time, the heating temperature is preferably 100 to 1000° C., and more preferably 300 to 700° C. If the heating temperature is less than 100° C., the growth of carbon nanofibers does not occur, or the growth is too slow, which may result in a low productivity. If the heating temperature exceeds 1000° C., the decomposition of the raw material gas is promoted, which may make the production of carbon nanofibers difficult.

The raw material gas is preferably a mixed gas of carbon-containing gas and hydrogen gas. Examples of carbon-containing gas include methane, ethane, ethylene, butane, acetylene, and carbon monoxide. The mixing ratio of the carbon-containing gas and the hydrogen gas is preferably from 0.2:0.8 to 0.8:0.2 in a molar ratio (volume ratio).

When the compound containing the catalytic element is heated to the predetermined temperature in the inert gas or reducing gas, it is reduced, so that the form of the catalytic element is converted to metal. If the heating process does not result in the formation of metal-form catalytic element on the surface of the material capable of absorbing and desorbing Li, the ratio of the hydrogen gas contained in the raw material gas is increased.

This allows the reduction of the compound containing the catalytic element to the catalytic element and the growth of the carbon nanofibers to proceed in parallel.

The negative electrode may be composed only of a negative electrode mixture, or may be composed of a negative electrode current collector and a negative electrode mixture layer carried thereon. Likewise, the positive electrode may be composed only of a positive electrode mixture or may be composed of a positive electrode current collector and a positive electrode mixture layer carried thereon.

The negative electrode mixture may contain a binder, etc., if necessary, in addition to the material capable of absorbing and desorbing Li serving as the negative electrode active material and the carbon material serving as the conductive agent.

The positive electrode mixture may contain a conductive agent, a binder, etc., if necessary, in addition to a positive electrode active material.

The material constituting the negative electrode current collector and the material constituting the positive electrode current collector can be any materials known in the art. The binder added to the negative electrode and the positive electrode, the conductive agent added to the positive electrode and the like can be any materials known in the art.

When the negative electrode is composed of a current collector and an active material layer carried thereon, the negative electrode can be prepared, for example, by applying a material mixture paste containing a material capable of absorbing and desorbing Li, a carbon material, etc. onto the surface of the current collector and drying it.

When the positive electrode is composed of a current collector and an active material layer carried thereof, it can be produced in the same manner as the negative electrode.

The non-aqueous electrolyte includes a non-aqueous solvent and a lithium salt dissolved in the non-aqueous solvent.

The non-aqueous solvent is not particularly limited, and any solvent commonly used in the art can be used. An example of the non-aqueous solvent is an aprotic organic solvent. Examples of aprotic organic solvents include cyclic carbonates such as ethylene carbonate, propylene carbonate, and butylene carbonate, cyclic carboxylic acid esters such as γ-butyrolactone, γ-valerolactone, and furanone, chain carbonates such as diethyl carbonate, ethyl methyl carbonate, and dimethyl carbonate, chain ethers such as 1,2-methoxyethane, 1,2-ethoxyethane, and ethoxymethoxyethane, and cyclic ethers such as tetrahydrofuran and 2-methyltetrahydrofuran. They can be used singly or in combination of two or more of them.

As long as the effects of the invention are not impaired, it is also possible to use non-aqueous solvents such as cyclic carbonates, cyclic carboxylic acid esters, and chain carbonates in which part of the hydrocarbon group is replaced with a halogen element such as fluorine.

Examples of the lithium salt contained in the non-aqueous electrolyte include $LiPF_6$, $LiBF_4$, and $LiAsF_6$. Among them, the use of $LiPF_6$ as the lithium salt is particularly preferable due to the high conductivity and high stability with respect to oxidation.

The method of adding a lithium perfluoroalkylsulfonyl imide represented by the above formula (1) into the positive electrode and/or negative electrode is not particularly limited. An exemplary method is to immerse the positive electrode or negative electrode in a solution of the lithium perfluoroalkylsulfonyl imide for a certain period of time and dry it.

When the positive electrode mixture or negative electrode mixture is prepared from a material mixture paste containing an active material, etc., as described above, the lithium perfluoroalkylsulfonyl imide can also be added into the positive electrode or negative electrode by mixing the material mixture paste with the lithium perfluoroalkylsulfonyl imide.

EXAMPLES

Example 1

Batteries 1 to 6

(i) Preparation of Negative Electrode Active Material
(Negative Electrode Active Material a-1)

99 parts by weight of a SiO powder (available from Wako Pure Chemical Industries, Ltd.) with a mean particle size of 10 μm, which was prepared by crushing and classification, was mixed with an aqueous solution of nickel nitrate (II) hexahydrate (guaranteed reagent available from Kanto Chemical Co., Inc.). The nickel nitrate (II) aqueous solution was prepared by dissolving nickel nitrate into ion-exchange water. Also, the amount of the added nickel nitrate (II) contained in the nickel nitrate (II) aqueous solution was 1 part by weight.

The resultant mixture was stirred for 1 hour and then the water content of the mixture was removed by an evaporator. In this way, the nickel nitrate was carried on the surface of the SiO particles.

Subsequently, the SiO particles with the nickel nitrate carried thereon were placed into a ceramic reaction vessel, and heated to 550° C. in the presence of helium gas. At this time, the nickel nitrate (II) was reduced to make it Ni simple substance. The helium gas was then replaced with a mixed gas of 50% by volume of hydrogen gas and 50% by volume of methane gas. Thereafter, the SiO particles were kept at 550° C. for 10 minutes, so that carbon nanofibers (CNFs) were grown on the surface of the SiO particles.

Thereafter, the mixed gas was replaced with helium gas, and the temperature inside the reaction vessel was allowed to cool to room temperature, to obtain a negative electrode active material a-1. The weight change before and after the treatment indicated that the content of CNFs in the negative electrode active material a-1 was 21% by weight of the total of the SiO, CNFs, and Ni simple substance.

The fiber diameter of the CNFs formed was 80 nm and the fiber length was 70 μm.

(Negative Electrode Active Material a-2

Using commercially available Ti powder and Sn powder as starting materials, a Ti—Sn alloy was synthesized in nitrogen by mechanical alloying. In the resultant Ti—Sn alloy, the Ti content was 50% by weight and the Sn content was 50% by weight. An X-ray diffraction analysis of the synthesized alloy confirmed that it included two phases of Sn and TiN.

This Ti—Sn alloy was classified so that the mean particle size was 10 μm.

A negative electrode active material a-2 was prepared in the same manner as the negative electrode active material a-1 except for the use of this Ti—Sn alloy. In the negative electrode active material a-2, the content of CNFs was 23% by weight of the total of the Ti—Sn alloy, CNFs, and Ni simple substance.

The fiber diameter of the CNFs formed was 100 nm, and the fiber length was 20 μm.

(Negative Electrode Active Material a-3)

Using a Ti—Si alloy prepared by a melting method as a starting material, an active material precursor was prepared in argon atmosphere by mechanical alloying. In the resultant precursor, the Ti content was 9% by weight and the Si content was 91% by weight. An electron diffraction analysis of the active material precursor using a transmission electron microscope confirmed that it included two phases of $TiSi_2$ phase and Si phase.

The active material precursor obtained was classified so that the mean particle size of the active material precursor was 10 μm.

A negative electrode active material a-3 was prepared in the same manner as the negative electrode active material a-1 except for the use of this active material precursor (Ti—Si alloy). In the negative electrode active material a-3, the content of CNFs was 23% by weight of the total of the Ti—Si alloy, CNFs, and Ni simple substance.

The fiber diameter of the CNFs formed was 50 nm, and the fiber length was 50 μm.

(ii) Preparation of Negative Electrode

Using the negative electrode active materials a-1 to a-3 obtained in the above manner, negative electrodes were prepared in the following manner.

A negative electrode mixture paste was prepared by kneading 90 parts by weight of the negative electrode active material a-1, 10 parts by weight of polyacrylic acid resin serving as a binder, and a suitable amount of water. This paste was applied onto both faces of a copper foil current collector (thickness 10 μm), rolled and dried to obtain a negative electrode plate. Lithium metal in an amount corresponding to irreversible capacity was deposited on the surface of the negative electrode plate. In this way, a negative electrode a-11 was prepared.

Negative electrodes a-21 and a-31 were prepared in the same manner as the negative electrode a-11 except for the use of the negative electrode active materials a-2 and a-3, respectively, instead of the negative electrode active material a-1.

In the negative electrodes a-11 to a-31, the ratios of the carbon material to the negative electrode mixture were 19% by weight, 22% by weight, and 22% by weight, respectively.

(iii) Preparation of Positive Electrode 100 parts by weight of $LiNi_{0.85}CO_{0.15}O_2$ powder was mixed with 3 parts by weight of acetylene black serving as a conductive agent and 4 parts by weight of polyvinylidene fluoride serving as a binder. The resultant mixture was mixed with a suitable amount of N-methyl-2-pyrrolidone to form a positive electrode mixture paste. This paste was applied onto both faces of an aluminum foil current collector (thickness 15 μm), and fully dried to obtain a positive electrode.

(iv) Preparation of Non-Aqueous Electrolyte

A non-aqueous electrolyte b-0 was prepared by dissolving $LiPF_6$ at a concentration of 1 mol/L in a non-aqueous solvent mixture containing ethylene carbonate, dimethyl carbonate, and ethyl methyl carbonate in a volume ratio of 1:2:3.

$LiN(CF_3SO_2)_2$ was dissolved at a predetermined concentration in the non-aqueous electrolyte b-0 to obtain a non-aqueous electrolyte b-11. Likewise, $LiN(C_2F_5SO_2)_2$ was dissolved at a predetermined concentration in the non-aqueous electrolyte b-0 to obtain a non-aqueous electrolyte b-21.

(v) Production of Cylindrical Battery

Cylindrical batteries as illustrated in FIG. 1 were produced.

First, one end of an aluminum positive electrode lead 8 was attached to a positive electrode 1 by ultrasonic welding. Likewise, one end of a copper negative electrode lead 9 was attached to a negative electrode 2. Thereafter, between the positive electrode 1 and the negative electrode 2 with the leads attached thereto, a microporous polyethylene separator 3 shaped like a belt wider than the two electrode plates was disposed to obtain a laminate. The laminate was wound into cylindrical form, to obtain an electrode plate group 4. Polypropylene insulating rings 10 and 11 were fitted to the upper and lower parts of the electrode plate group 4, respectively, and the electrode plate group was inserted into a battery case 5.

The other end of the positive electrode lead 8 was welded to a seal plate 6, while the other end of the negative electrode lead 9 was welded to the bottom of the battery case 5. Subsequently, the non-aqueous electrolyte prepared in the above manner was injected into the battery case 5 by the injection method as described below. Thereafter, the open edge of the battery case 5 was crimped onto the seal plate 6 with a gasket 7 interposed therebetween. In this way, non-aqueous electrolyte batteries were completed. These batteries had a diameter of 18 mm and a total height of 65 mm.

In these batteries, the ratio of the weight of $LiN(CF_3SO_2)_2$ or $LiN(C_2F_5SO_2)_2$ (hereinafter referred to as an additive) contained in the non-aqueous electrolyte to the weight of CNFs contained in the negative electrode was $10^{-1}$.

The design capacity of the battery using the negative electrode a-11 was 2650 mAh. The design capacity of the battery using the negative electrode a-21 was 2450 mAh. Also, the design capacity of the battery using the negative electrode a-31 was 2750 mAh.

(Injection Method of Non-Aqueous Electrolyte)

Injection of the non-aqueous electrolyte was performed by the following vacuum impregnation. A predetermined injection amount of the electrolyte was divided into three equal parts. While the battery case was being evacuated, an aliquot of the non-aqueous electrolyte was injected into the battery case, and after the completion of the electrolyte injection, the pressure inside the battery case was allowed to rise to the atmospheric pressure. Such vacuum impregnation was repeated three times.

(Measurement of Injection Time of Electrolyte)

Injection time of electrolyte was defined as the time elapsed from the start of injection of the non-aqueous electrolyte to the time point in the third injection at which the liquid level of the non-aqueous electrolyte dropped below the upper end surface of the electrode plate group.

In this example, batteries using the negative electrodes a-11 to a-31 and the non-aqueous electrolyte b-11 were designated as batteries 1 to 3, respectively, and batteries using the negative electrodes a-11 to a-31 and the non-aqueous electrolyte b-21 were designated as batteries 4 to 6, respectively.

Batteries using the negative electrodes a-11 to a-31 and the non-aqueous electrolyte b-0 were designated as batteries A to C, respectively. A battery using artificial graphite as the negative electrode active material and the non-aqueous electrolyte b-0 was designated as a battery D. The batteries A to D are comparative batteries.

[Evaluation]

The battery capacity and capacity retention rate of the batteries obtained were measured in the following manner.

(Measurement of Battery Capacity)

Each battery was charged and discharged at 25° C. in the following conditions.

Each battery was charged at a constant current of an hour rate of 0.7 C until the battery voltage reached 4.2 V, and then charged at a constant voltage of 4.2 V until the current value dropped to an hour rate of 0.05 C. After an interval of 30 minutes, the charged battery was discharged at a current value of an hour rate of 0.2 C until the battery voltage dropped to 2.5 V. The discharge capacity obtained was defined as the battery capacity. Table 1 shows the results.

(Measurement of Capacity Retention Rate)

Each battery was charged and discharged at 25° C. in the following conditions.

Each battery was charged at a constant current of an hour rate of 0.5 C until the battery voltage reached 4.2 V, and then charged at a constant voltage of 4.2 V until the current value dropped to an hour rate of 0.05 C. After an interval of 30 minutes, the charged battery was discharged at a current value of an hour rate of 1.0 C until the battery voltage dropped to 2.5 V. After the discharge, it was allowed to stand for 30 minutes.

This charge/discharge cycle was repeated 50 times, and the ratio of the discharge capacity at the 50th cycle to the discharge cycle at the 1st cycle was expressed in percentage. The resultant value was defined as the capacity retention rate (%). The closer the capacity retention rate is to 100%, the better the cycle life. Table 1 shows the results.

Table 1 also shows the kinds of the negative electrode and non-aqueous electrolyte used and the injection times.

TABLE 1

| | Negative electrode | Non-aqueous electrolyte | Injection time (min.) | Battery capacity (mAh) | Capacity retention rate (%) |
|---|---|---|---|---|---|
| Battery 1 | a-11 | b-11 | 15 | 2633 | 84 |
| Battery 2 | a-21 | b-11 | 16 | 2432 | 82 |
| Battery 3 | a-31 | b-11 | 15 | 2755 | 83 |
| Battery 4 | a-11 | b-12 | 15 | 2635 | 80 |
| Battery 5 | a-21 | b-12 | 16 | 2433 | 81 |
| Battery 6 | a-31 | b-12 | 16 | 2760 | 84 |
| Comp. battery A | a-11 | b-0 | 61 | 2035 | 35 |
| Comp. battery B | a-21 | b-0 | 59 | 1950 | 41 |
| Comp. battery C | a-31 | b-0 | 60 | 2025 | 37 |
| Comp. battery D | Graphite | b-0 | 18 | 2225 | 89 |

Table 1 indicates that the batteries 1 to 6 have dramatically improved battery capacities and capacity retention rates compared with the comparative batteries A to D.

Also, the injection times of the batteries 1 to 6 were significantly reduced compared with the comparative batteries A to C which were different only in that their non-aqueous electrolytes contained no additive.

In the comparative battery D, the injection time was 18 minutes, which was slightly longer than those of the batteries 1 to 6. The injection time is mainly related to the wettability of the material with the non-aqueous electrolyte, the amount of space (pores) in the electrode plate for receiving the non-aqueous electrolyte, and the shape of the space. As described above, the wettability of carbon materials such as artificial graphite with non-aqueous electrolyte is not high. In the case of the comparative battery D, its design capacity is 2230 mAh and its electrode plates have space for receiving a relatively large amount of the non-aqueous electrolyte, and this is probably the reason why the injection of the non-aqueous electrolyte was completed in a relatively short period of time. However, it was confirmed that when artificial graphite was filled at a higher density (e.g., approximately 2600 mAh) than in the comparative battery D, the injection time required approximately 60 minutes.

Example 2

Batteries 7 to 20

$LiN(CF_3SO_2)_2$ was dissolved in the non-aqueous electrolyte b-0 so that the ratio of the weight of $LiN(CF_3SO_2)_2$ to the weight of CNFs was $10^{-4}$, $10^{-3}$, $10^{-2}$, $10^{-1}$, 1, 10, and $10^2$, to obtain non-aqueous electrolytes b-12 to b-18, respectively.

Likewise, $LiN(C_2F_5SO_2)_2$ was dissolved in the non-aqueous electrolyte b-0 so that the ratio of the weight of $LiN(C_2F_5SO_2)_2$ to the weight of CNFs was $10^{-4}$, $10^{-3}$, $10^{-2}$, $10^{-1}$, 1, 10, and $10^2$, to obtain non-aqueous electrolytes b-22 to b-28, respectively.

Batteries 7 to 20 were produced in the same manner as the battery 1 except for the use of the negative electrode a-11 and the non-aqueous electrolytes b-12 to b-18 and b-22 to b-28, respectively. The design capacity of these batteries was set to 2650 mAh in the same manner as in Example 1. The battery 7, battery 13, and batteries 14 and 20 are comparative batteries.

The capacity retention rates of the batteries 7 to 20 were obtained in the same manner as in Example 1. Table 2 shows the results. Table 2 also shows the kinds of the negative electrode and non-aqueous electrolyte, the ratios of the additive to CNFs, and the injection times.

TABLE 2

|  | Negative electrode | Non-aqueous electrolyte | Ratio of additive to CNFs | Injection time (min.) | Capacity retention rate (%) |
|---|---|---|---|---|---|
| Comp. battery 7 | a-11 | b-12 | $10^{-4}$ | 85 | 81 |
| Battery 8 | a-11 | b-13 | $10^{-3}$ | 23 | 82 |
| Battery 9 | a-11 | b-14 | $10^{-2}$ | 20 | 81 |
| Battery 10 | a-11 | b-15 | $10^{-1}$ | 17 | 78 |
| Battery 11 | a-11 | b-16 | 1 | 16 | 79 |
| Battery 12 | a-11 | b-17 | 10 | 17 | 80 |
| Comp. battery 13 | a-11 | b-18 | $10^{2}$ | 16 | 59 |
| Comp. battery 14 | a-11 | b-22 | $10^{-4}$ | 85 | 81 |
| Battery 15 | a-11 | b-23 | $10^{-3}$ | 23 | 82 |
| Battery 16 | a-11 | b-24 | $10^{-2}$ | 21 | 82 |
| Battery 17 | a-11 | b-25 | $10^{-1}$ | 19 | 79 |
| Battery 18 | a-11 | b-26 | 1 | 19 | 80 |
| Battery 19 | a-11 | b-27 | 10 | 18 | 81 |
| Comp. battery 20 | a-11 | b-28 | $10^{2}$ | 17 | 57 |

Table 2 indicates that in the comparative batteries 13 and 20 in which the ratio (weight ratio) of the lithium perfluoroalkylsulfonyl imide to the carbon material is $10^{2}$, their capacity retention rates are approximately 60%, and therefore that their capacity retention rates are significantly lower than those of the other batteries. Also, in the comparative batteries 7 and 14 in which the ratio of the lithium perfluoroalkylsulfonyl imide is $10^{-4}$, their injection times are 85 minutes, which is significantly longer than those of the other batteries. Therefore, the ratio of the weight of the lithium perfluoroalkylsulfonyl imide to the weight of the carbon material needs to be $10^{-3}$ to 10.

Example 3

Batteries 21 to 28

Negative electrode active materials a-4 to a-11 were prepared in the same manner as the negative electrode active material a-1, except that the growth time of CNFs was controlled to make the ratio of the weight of CNFs to the total weight of SiO, CNFs, and Ni simple substance (hereinafter referred to as the weight ratio of CNFs) 3% by weight, 5% by weight, 10% by weight, 30% by weight, 40% by weight, 50% by weight, 70% by weight, and 80% by weight, respectively. Using the negative electrode active materials a-4 to a-11, negative electrodes a-41 to a-111 were prepared in the same manner as the negative electrode a-11, respectively.

The fiber diameter of CNFs contained in the negative electrode active material a-4 was 80 nm, and the fiber length was 20 μm. The fiber diameter of CNFs contained in the negative electrode active material a-5 was 80 nm, and the fiber length was 20 μm. The fiber diameter of CNFs contained in the negative electrode active material a-6 was 80 nm, and the fiber length was 70 μm. The fiber diameter of CNFs contained in the negative electrode active material a-7 was nm, and the fiber length was 100 μm. The fiber diameter of CNFs contained in the negative electrode active material a-8 was 80 nm, and the fiber length was 120 μm. The fiber diameter of CNFs contained in the negative electrode active material a-9 was 80 nm, and the fiber length was 120 μm. The fiber diameter of CNFs contained in the negative electrode active material a-10 was 80 nm, and the fiber length was 150 μm. The fiber diameter of CNFs contained in the negative electrode active material a-11 was 80 nm, and the fiber length was 150 μm.

Also, in the negative electrodes a-41 to a-111, the ratios of the CNFs to the negative electrode mixture were 2.77% by weight, 4.5% by weight, 9.0% by weight, 27% by weight, 36% by weight, 45% by weight, 64% by weight, and 73% by weight, respectively.

Batteries 21 to 28 were produced in the same manner as the battery 1 except for the use of the negative electrodes a-41 to a-111 and the non-aqueous electrolyte b-11, respectively.

The battery capacity and capacity retention rate of these batteries were measured in the same manner as in Example 1. Table 3 shows the results. Table 3 also shows the kinds of the negative electrode and non-aqueous electrolyte, the weight ratios of the CNFs, and the injection times.

TABLE 3

|  | Negative electrode | Non-aqueous electrolyte | Weight ratio of CNFs (wt %) | Injection time (min.) | Battery capacity (mAh) | Capacity retention rate (%) |
|---|---|---|---|---|---|---|
| Battery 21 | a-41 | b-11 | 3 | 16 | 2786 | 48 |
| Battery 22 | a-51 | b-11 | 5 | 17 | 2723 | 78 |
| Battery 23 | a-61 | b-11 | 10 | 16 | 2585 | 81 |
| Battery 24 | a-71 | b-11 | 30 | 16 | 2505 | 84 |
| Battery 25 | a-81 | b-11 | 40 | 15 | 2499 | 86 |
| Battery 26 | a-91 | b-11 | 50 | 15 | 2420 | 85 |
| Battery 27 | a-101 | b-11 | 70 | 17 | 2305 | 88 |
| Battery 28 | a-111 | b-11 | 80 | 16 | 2210 | 89 |

In the battery 21 in which the weight ratio of CNFs was 3% by weight, the capacity retention rate was 48%, which is a low value. Also, in the battery 28 in which the weight ratio of CNFs was 80% by weight, the battery capacity was a small value. Therefore, the preferable weight ratio of CNFs is 5 to 70% by weight.

Example 4

Battery 29

The negative electrode a-31 was immersed in a diethyl carbonate (DEC) solution containing 0.5 mol/L of LiN$(CF_3SO_2)_2$ for 1 hour, and the immersed negative electrode was then dried to obtain a negative electrode a-131 containing LiN$(CF_3SO_2)_2$. In the negative electrode a-131, the ratio of the weight of LiN$(CF_3SO_2)_2$ to the weight of CNFs was 5.

A battery 29 was produced in the same manner as the battery 1 except for the use of the negative electrode a-131 and the non-aqueous electrolyte b-0.

Battery 30

The positive electrode prepared in the same manner as in Example 1 was immersed in a DEC solution containing 0.5 mol/L of LiN$(CF_3SO_2)_2$ for 1 hour, and the immersed positive electrode was then dried to obtain a positive electrode c-1 containing LiN$(CF_3SO_2)_2$. The weight ratio of LiN$(CF_3SO_2)_2$ contained in the positive electrode to the CNFs contained in the negative electrode was 5.

A battery 30 was produced in the same manner as the battery 1 except for the use of the negative electrode a-31, the positive electrode c-1, and the non-aqueous electrolyte b-0.

The injection times, battery capacities, and capacity retention rates of the batteries 29 and 30 were measured in the same manner as in Example 1. Table 4 shows the results.

TABLE 4

|  | Where additive is added | Injection time (min.) | Battery capacity (mAh) | Capacity retention rate (%) |
|---|---|---|---|---|
| Battery 29 | Negative electrode | 12 | 2748 | 86 |
| Battery 30 | Positive electrode | 28 | 2729 | 82 |

Table 4 indicates that when a lithium perfluoroalkylsulfonyl imide is contained in the negative electrode or positive electrode, equivalent battery capacities and capacity retention rates can be obtained.

INDUSTRIAL APPLICABILITY

The non-aqueous electrolyte secondary battery of the invention has a high capacity and excellent cycle characteristics. Therefore, the non-aqueous electrolyte secondary battery of the invention can be preferably used, for example, as the power source for portable appliances.

The invention claimed is:

1. A non-aqueous electrolyte secondary battery comprising: a positive electrode comprising a positive electrode mixture; a negative electrode comprising a negative electrode mixture; and a non-aqueous electrolyte,
wherein said negative electrode mixture includes a material capable of absorbing and desorbing Li and a carbon material,
said material capable of absorbing and desorbing Li includes at least one element selected from the group consisting of Si and Sn,
the amount of said carbon material is 3 to 60% by weight of said negative electrode mixture,
at least one of said positive electrode, said negative electrode, and said non-aqueous electrolyte contains a lithium perfluoroalkylsulfonyl imide represented by the following general formula (1):

$$\text{LiN}(C_mF_{2m+1}SO_2)(C_nF_{2n+1}SO_2) \tag{1}$$

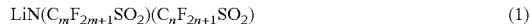

where m and n each represent an integer of 1 to 5 and may be m=n, and
the ratio of the total weight of said lithium perfluoroalkylsulfonyl imide contained in at least one of said positive electrode, said negative electrode, and said non-aqueous electrolyte to the weight of said carbon material is $10^{-3}$ to 10.

2. The non-aqueous electrolyte secondary battery in accordance with claim 1, wherein said lithium perfluoroalkylsulfonyl imide is at least one selected from the group consisting of $\text{LiN}(CF_3SO_2)_2$ and $\text{LiN}(C_2F_5SO_2)_2$.

3. The non-aqueous electrolyte secondary battery in accordance with claim 1, wherein said carbon material is carbon nanofibers.

4. The non-aqueous electrolyte secondary battery in accordance with claim 3, wherein said carbon nanofibers are bonded to a surface of said material capable of absorbing and desorbing Li, and a catalytic element for promoting the growth of said carbon nanofibers is carried on the surface of said material capable of absorbing and desorbing Li or an end of said carbon nanofibers.

5. The non-aqueous electrolyte secondary battery in accordance with claim 4, wherein said carbon nanofibers account for 5 to 70% by weight of the total of said carbon nanofibers, said material capable of absorbing and desorbing Li, and said catalytic element.

6. The non-aqueous electrolyte secondary battery in accordance with claim 1, wherein said lithium perfluoroalkylsulfonyl imide is contained in at least said negative electrode.

7. The non-aqueous electrolyte secondary battery in accordance with claim 1, wherein said material capable of absorbing and desorbing Li is at least one oxide selected from the group consisting of $SiO_x$ and $SnO_y$ where $0<x<2$ and $0<y\leq2$.

8. The non-aqueous electrolyte secondary battery in accordance with claim 1, wherein
at least said non-aqueous electrolyte contains said lithium perfluoralkylsulfonyl imide, and
the concentration of said lithium perfluoralkylsulfonyl imide in said non-aqueous electrolyte is less than 1 mol/L.

9. The non-aqueous electrolyte secondary battery in accordance with claim 1, wherein
said non-aqueous electrolyte contains at least one supporting salt selected from the group consisting of $\text{LiPF}_6$, $\text{LiBF}_4$, and $\text{LiAsF}_6$, and an additive, and
said additive is said lithium perfluoralkylsulfonyl imide.

* * * * *